United States Patent
Heinemeier et al.

(10) Patent No.: US 7,284,651 B2
(45) Date of Patent: Oct. 23, 2007

(54) CONVEYOR SYSTEM AND METHOD OF CONVEYING ELEMENTS

(75) Inventors: Thomas Heinemeier, Macomb, MI (US); Peter Karrer, Harper Woods, MI (US)

(73) Assignee: Durr Systems, Inc., Plymouth, MI (US)

( * ) Notice: Subject to any disclaimer, the term of this patent is extended or adjusted under 35 U.S.C. 154(b) by 52 days.

(21) Appl. No.: 11/157,005

(22) Filed: Jun. 20, 2005

(65) Prior Publication Data

US 2006/0283687 A1    Dec. 21, 2006

(51) Int. Cl.
*B65G 47/00*   (2006.01)

(52) U.S. Cl. .............. 198/345.3; 198/463.3; 198/468.6

(58) Field of Classification Search .......... 198/345.3, 198/463.3, 809, 468.6
See application file for complete search history.

(56) References Cited

U.S. PATENT DOCUMENTS

| | | | | |
|---|---|---|---|---|
| 4,279,583 A * | 7/1981 | Martin, Sr. | ............... | 425/253 |
| 4,646,915 A * | 3/1987 | Ohtaki et al. | ........... | 198/346.2 |
| 4,838,178 A * | 6/1989 | Chriske et al. | ........... | 108/55.1 |
| 5,322,156 A * | 6/1994 | Kakita et al. | ............ | 198/463.3 |
| 6,168,366 B1 * | 1/2001 | Horn | ..................... | 414/416.03 |
| 6,220,420 B1 * | 4/2001 | Jan et al. | ................. | 198/369.1 |
| 6,250,458 B1 * | 6/2001 | Shibayama et al. | ........ | 198/851 |
| 6,360,881 B2 * | 3/2002 | Stebnicki et al. | .......... | 198/850 |
| 6,499,587 B1 * | 12/2002 | Greve | ........................ | 198/853 |
| 6,515,944 B1 * | 2/2003 | Yoshida et al. | .......... | 369/30.23 |
| 6,523,680 B2 * | 2/2003 | Guldenfels | ................... | 198/853 |
| 6,533,122 B1 * | 3/2003 | Plunkett | ..................... | 206/600 |
| 6,564,933 B2 * | 5/2003 | Morimoto et al. | .......... | 198/850 |
| 6,669,003 B2 * | 12/2003 | Vassel | ........................ | 198/435 |
| 6,779,653 B2 * | 8/2004 | Garbagnati | ................. | 198/853 |
| 6,793,069 B2 * | 9/2004 | Guldenfels | ................... | 198/853 |
| 6,811,023 B1 * | 11/2004 | Christiana et al. | ......... | 198/822 |
| 2002/0078863 A1 * | 6/2002 | Marr et al. | .............. | 108/57.32 |
| 2006/0070859 A1 * | 4/2006 | Pahlow et al. | .............. | 198/809 |

* cited by examiner

*Primary Examiner*—Mark A Deuble
(74) *Attorney, Agent, or Firm*—Howard & Howard Attorneys, P.C.

(57) ABSTRACT

The method of conveying elements on a conveyor system of this invention includes conveying an element on a first continuously moving conveyor in a first direction at a first height, then lifting the element from the first conveyor upwardly to a second height and simultaneously moving the element in the first direction, reducing damage to the conveyor and the element. The element may be returned to the first conveyor by lowering the element and simultaneously accelerating the element to generally the velocity of the first conveyor or transferred to a second conveyor at the second height. The conveyor system of this invention includes spaced parallel plastic moving belts and the elements are conveyed on a pallet having a soft metal base. The lift tables include parallelogram lift and lowering linkages.

31 Claims, 11 Drawing Sheets

CONVEYOR SYSTEM AND METHOD OF CONVEYING ELEMENTS

FIELD OF THE INVENTION

This invention relates to conveyor systems and methods of conveying articles or elements on a conveyor which extends the useful life of the conveyor and reduces damage to the elements conveyed by the conveyor, particularly including expensive pallets to convey heavy parts by many industries. The method and conveyor system of this invention may be utilized to convey large parts, such as vehicle bodies, through an automotive manufacturing plant, typically mounted on pallets to various locations in the manufacturing facility.

BACKGROUND OF THE INVENTION

Various industries now convey heavy parts or components mounted on expensive pallets, which may cost in excess of $20,000, on conveyor systems through an assembly or manufacturing plant for various operations, such as assembly, welding, painting and the like. As will be understood by those skilled in this art, such conveyor systems must be rugged, reliable and capable of stopping movement of the parts at various locations for such operations. Further, such operations may take different lengths of time and therefore such conveyors must be capable of staggering the parts on the conveyor system and then convey the parts to various locations for such operations.

A typical conveyor system of this type may include spaced lift tables which lift the parts from the conveyor for timed conveyance as required by the operations. Thus, movement of the parts or components on the conveyor are stopped, restarted and conveyed in different directions depending upon the needs of the manufacturing or assembly process. The sudden stops, restarts and changes in direction result in wear or damage to the conveyor system, the pallets and sometimes the parts conveyed. Thus, there is a continuing need for improvements in conveyor systems and methods of conveying parts, particularly heavy parts, which reduces wear and damage.

In an automotive manufacturing or paint facility, for example, vehicle bodies are typically conveyed through the manufacturing, assembly or paint facility for various secondary operations, including, for example, assembly of components on the vehicle bodies, welding, painting and other secondary operations. Such vehicle bodies are typically mounted on expensive pallets which generally include critical datums for locating points on the conveyed parts for such secondary operations. A typical conveyor system in an automotive manufacturing or paint plant includes continuous steel chains and the pallets include a hardened steel base. Nevertheless, the chain conveyors wear and must be periodically replaced. Further, the conveyors have retractable stops which engage and suddenly stop the pallets, damaging the pallets including the steel base, requiring periodic replacement of the pallets and the base cannot be used as a datum because of such damage.

The method of conveying elements and conveyor systems of this invention reduces or substantially eliminates wear or damage to the conveyor system when conveying heavy parts or components and pallets when the parts or components are mounted on pallets.

SUMMARY OF THE INVENTION

The conveyor system of this invention is rugged, reliable and operates in a unique way to avoid damage to the conveyor and the elements conveyed by the conveyor system. The conveyor system of this invention may be utilized to convey heavy parts or components as required by many industries. Where the parts or components are conveyed on pallets, the conveyor system of this invention also avoids wear or damage to the pallets. As set forth above, many industries now use expensive pallets to convey parts or components having one or a plurality of datums and the parts or components are mounted on the pallets for secondary operations, such as assembly of components or welding, which requires accurate location of points on the parts conveyed by robots or the like. The conveyor system of this invention is also flexible and may be utilized to stop or hold the parts at any predetermined locations for timing reasons or secondary operations and convey the parts or components in any direction as required by the operations of the facility. For ease of this description, the parts, components or assemblies conveyed by the conveyor system will be referred to as "elements" and may be any part, component or assembly which is conveyed by a conveyor system with or without a pallet.

One preferred embodiment of the invention includes two spaced parallel continuous plastic belts preferably comprised of pivotally interconnected plastic links. The plastic belts are received around and driven by sprockets, typically including a drive sprocket and a driven sprocket. In a typical application for conveying heavy elements on a conveyor, such as used to convey vehicle bodies by the automotive industry, the conveyor includes a hardened steel belt or steel chain belt and the pallet has a hardened steel base. Nevertheless, the steel belt of the conveyor wears and must be frequently replaced. Further, the conveyor includes retractable stops which stop the pallet as required for the facility and the pallet is worn or damaged by the steel conveyor belt and the sudden stops, damaging the steel base of the pallet requiring replacement and making it impractical to use the steel base as a datum for such applications. Finally, the noise level generated by the conveyor system requires the use of noise reduction protective head gear. The plastic conveyor of this invention permits the use of pallets having a low carbon relatively soft steel base, resulting in significantly less wear and damage to both the plastic belts and the softer low carbon steel base and significantly reduces noise.

The conveyor system and method of this invention also permits stopping or holding of the conveyed elements without damage to the conveyed elements or the conveyer. The conveyed elements may be held on or preferably above the conveyor for timing purposes or to direct the elements in a second direction on a second conveyor without sudden impact stops. The method of conveying elements on a conveyor system of this invention includes conveying an element on a first moving conveyor in a first direction at a first height, then lifting the element from the first moving conveyor upwardly to a second height and simultaneously moving the element in the first direction, thereby reducing shock to the element or the conveyor as the element is moved from the first moving conveyor to the second height. In one preferred embodiment, the method includes initially moving the element in the first direction at generally the velocity of the first moving conveyor as the element is lifted from the first moving conveyor, then decelerating movement of the element as the element is moved upwardly to the second height.

In a preferred embodiment of the conveyor system of this invention, the elements are lifted from the first conveyor by a lift table having a parallelogram support, such that the elements are lifted from the first conveyor at generally the speed or velocity of the first conveyor and lifted to the second height in parallel relation to the first conveyor and decelerated to a hold position at the second height above the first conveyor. The conveyed elements may then be transferred to a second conveyor at the second height or a plurality of elements may be held above the first conveyor for later transfer seriatim.

One preferred embodiment of the conveyor system of this invention includes a plurality of spaced lift tables, preferably located between the belts of the conveyor, which lift elements from the first continuously moving conveyor upwardly to the second height and simultaneously move the elements in the first direction of the conveyor, thereby reducing shock to the elements as described above. The elements may be held in the second position above the conveyor as required by the timing of the operations of the manufacturing or assembly facility. When the elements are ready for use, the elements are then accelerated to generally the velocity of the first conveyor and simultaneously lowered onto to the first conveyor, significantly reducing wear to the conveyor belts and the base of a pallet if the elements are conveyed on a pallet. Alternatively, the lift table may be located at the end of a run of the first conveyor for transfer in a second direction, preferably at the second height. In the disclosed embodiment, the lift table extends generally transverse to the direction of travel of the first conveyor, wherein the lift table receives an element from the first conveyor and simultaneously lifts the element to the second height and moves the element in the direction of travel of the first conveyor. In a preferred embodiment, as described above, the lift table decelerates motion of the element to a rest position at the second height. In this embodiment, the lift table may include stops which align the pallet on the lift table, but the stops do not result in a sudden impact of the element with the stops as with conventional conveyors.

The conveyor system of this invention may then include a second conveyor aligned with the lift table, preferably at the second height, for conveying the elements in a second direction. In this embodiment, the second conveyor may include driven rollers, rather than a belt-type conveyor, and the elements may be conveyed to a work station, for example, or to a third conveyor. Where the elements are transferred to a third conveyor, such as a continuous belt-type conveyor described above, the third conveyor preferably has a height less than the second conveyor, such as the first height of the first conveyor. The elements are then transferred to the third conveyor, preferably with a table having a parallelogram support, wherein the elements are simultaneously accelerated to the velocity of the third conveyor and lowered onto the third conveyor as described above with regard to the lift tables. In the disclosed embodiment, the third conveyor may be identical to the first conveyor including spaced continuous plastic belts.

As will be understood from the above description, the conveyor system and method of this invention significantly reduces wear or damage to the conveyors and the elements conveyed and is particularly useful for conveying heavy elements such as vehicle bodies mounted on expensive pallets, reducing wear or damage to the conveyor and the elements conveyed and further reducing noise. As will be understood, the following description of the preferred embodiments is for illustrative purposes only and various modifications may be made to the conveyor system and method of this convention within the purview of the appended claims as further described below.

DESCRIPTION OF THE PREFERRED EMBODIMENTS

As set forth above, the conveyor system 10 and method of this invention may be utilized to convey elements of any type in a manufacturing or assembly facility, but is particularly useful for transferring heavy elements in a mass production facility, such as vehicle bodies 20 in an automotive manufacturing, assembly or paint facility. As will be understood, however, the conveyor system and method of this invention is not limited to the elements conveyed and the elements may be conveyed with the conveyor system and method of this invention without pallets.

Figure 1:
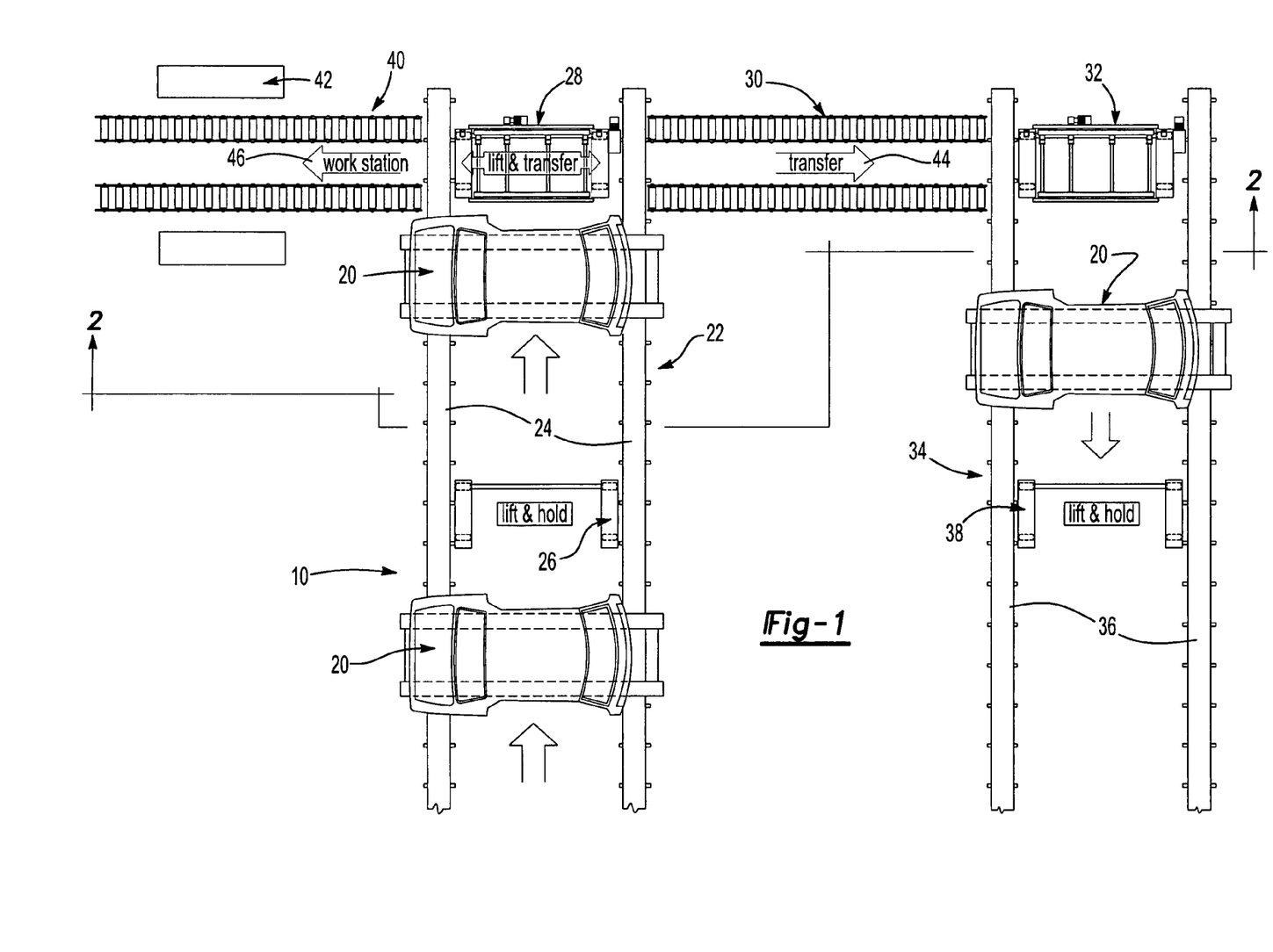
FIG. 1 is a top view of one embodiment of a conveyor system of this invention for conveying vehicle bodies.

The embodiment of the conveyor system 10 illustrated in FIG. 1 for transferring or conveying vehicle bodies 20 includes a first conveyor 22 preferably including spaced continuous moving belts 24 as described more fully hereinbelow. The disclosed embodiment of the conveyor system 10 further includes one or a plurality of lift and hold tables 26, more accurately referred to as lift, hold and return tables which, in a preferred embodiment, are located between the spaced continuous moving belts 24 of the conveyor 22 and a lift and transfer table 28, which may be located at or adjacent the end of the run of the conveyor 22, although the lift and transfer table 28 may be located at any position in the run of the conveyor 22 for transferring vehicle bodies 20 to a second conveyor. In the disclosed embodiment, the lift and transfer table 28 extends generally transverse to the run of the conveyor 22. The disclosed embodiment of the conveyor system 10 further includes a second conveyor 30 in line with the lift and transfer table 28 and a lower and transfer table 32 for transferring vehicle bodies to a third conveyor 34. For ease of description and understanding, the conveyor 22 is referred to as the first conveyor, the transfer conveyor 30 is referred to as the second conveyor and the conveyor 34 is referred to as the third conveyor. In the disclosed embodiment, the second conveyor 30 is a conventional roller-type conveyor, wherein a plurality of rollers are driven by motors (not shown) and the third conveyor 34 may be identical to the first conveyor 22 having spaced continuous parallel moving belts 36 and a lift and hold table 38 between the belts 36. Further, for ease of description, the lift and hold tables 26 and 38, the lift and transfer table 28 and the lower and transfer table 32 is sometimes referred to herein as lift tables, although the function may also be to lower the vehicle bodies onto the spaced continuous moving belts 24 and 36 as described hereinbelow.

The disclosed embodiment of the conveyor system 10 further includes a fourth conveyor 40 in line with the lift and transfer table 26 for moving a vehicle body 20 to a workstation 42 which may be any type of work station, including a robotic workstation used for assembly of components, welding or the like. In the disclosed embodiment, the fourth conveyor 40 is also a conventional roller-type conveyor, the same or similar to the second conveyor 30. As will be understood by those skilled in this art, the arrangement of the conveyor system 10 will be dependent upon the work requirements of the facility and the disclosed embodiment of the conveyor system is merely for illustrative purposes to illustrate the improved components of the conveyor system of this invention. With the conveyor system 10, a vehicle body 20 may be transferred or conveyed by the first conveyor 22, which may include one or a plurality of spaced lift and hold tables 26 which lift a vehicle body 20 above the moving belts 24 of the first conveyor 22 and return the vehicle body 20 to the conveyor 22, sequentially or as required by the facility. The lift and transfer table 28 lifts the vehicle body 20 from the first conveyor 22 for transfer either to a second conveyor 30 for transfer to a third conveyor 34 or transfer the vehicle body by fourth conveyor 40 to a workstation 42. In one preferred embodiment of the conveyor system of this invention, the first conveyor 22 has a first predetermined height (which is the level of the spaced continuous moving belts 24) and the second and fourth conveyors 30 and 40, respectively, have a second height spaced above the height of the first conveyor 24. The third conveyor 34 in a preferred embodiment has a height below the height of the second conveyor 30, which may be the height of the first conveyor 24.

Figure 2:
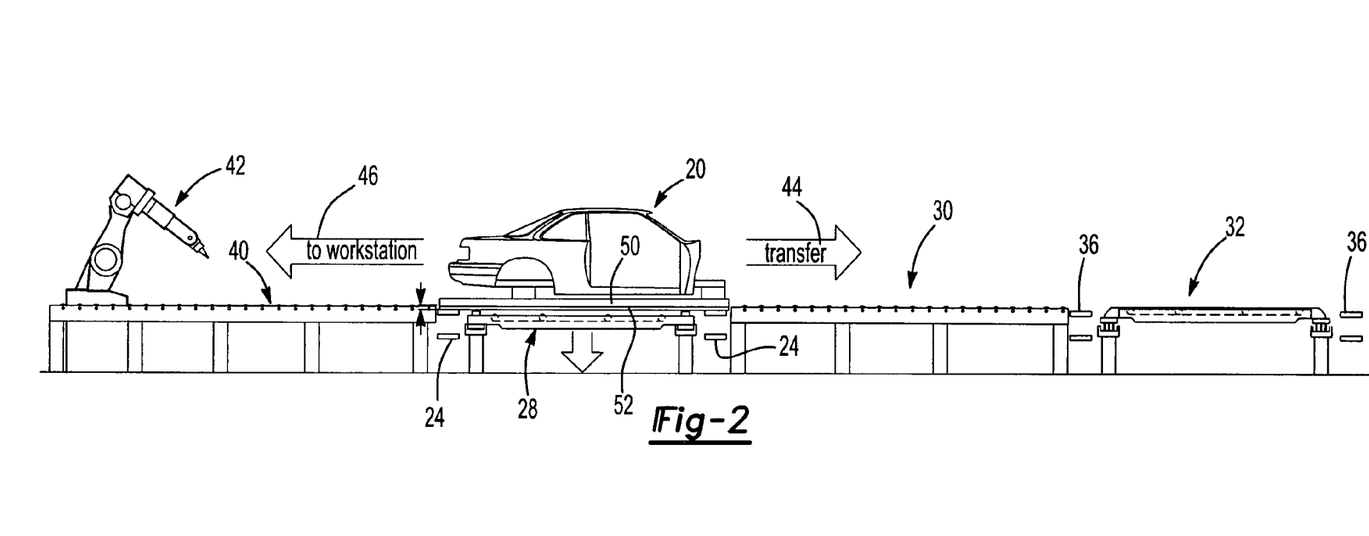
FIG. 2 is a side view of FIG. 1 in the direction of view arrows 2-2.
Figure 3:
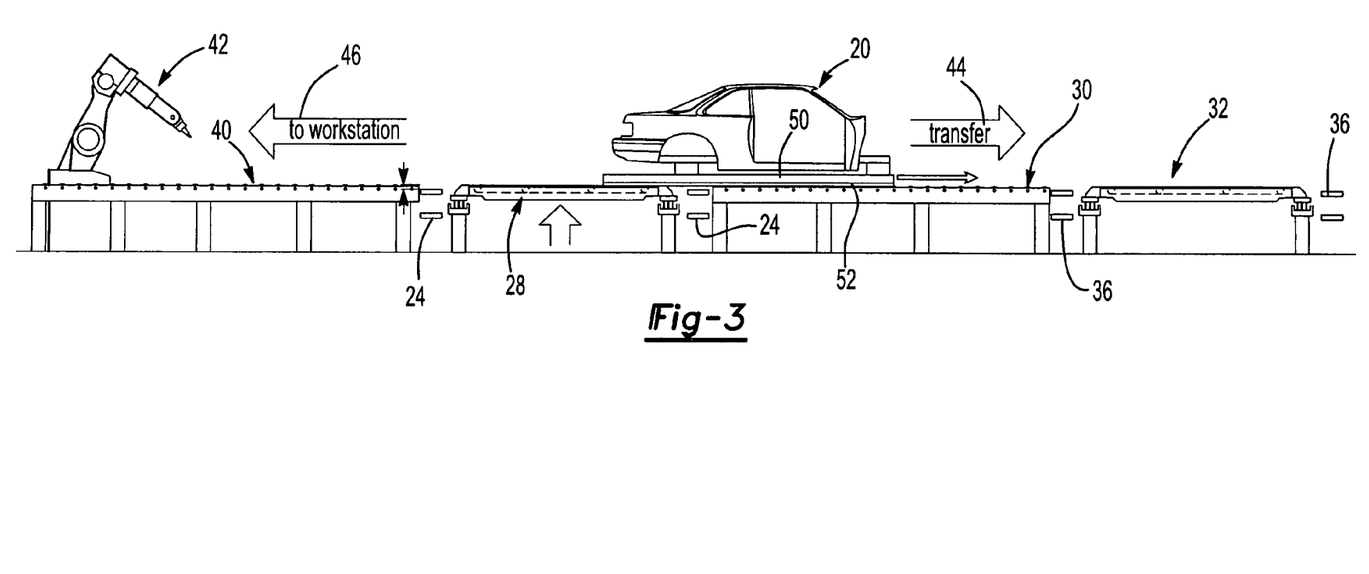
FIG. 3 is a side view similar to FIG. 2 with a vehicle body being transferred to another conveyor.
Figure 4:
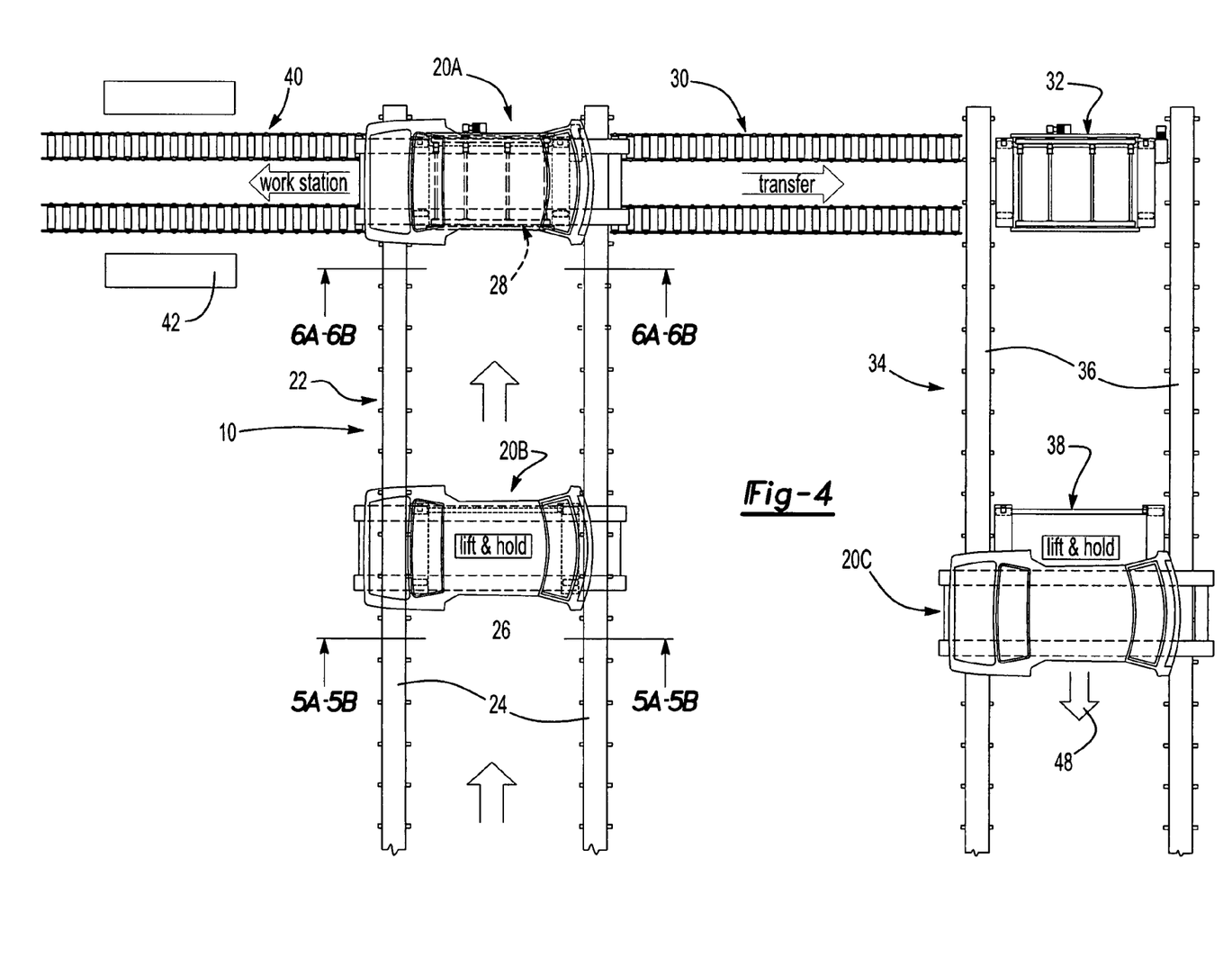
FIG. 4 is a top view of the conveyor system shown in FIG. 1 with the vehicle bodies transferred to different locations.

FIGS. 2 and 3 illustrate movement of a vehicle body 20 from the lift and transfer table 28 to the lower and transfer table 32 by the second conveyor 30 as shown by arrow 44 or to the workstation 42 by conveyor 40 as shown by arrow 46. As shown in FIGS. 2 and 3, the second and fourth conveyors 30 and 40, respectively, are preferably at the same height as the lift and transfer table 28 at the second elevated height as will be understood from the description of the lift tables hereinbelow. FIG. 4 is another illustration of the conveyor system 10 shown in FIGS. 1 to 3, wherein a vehicle body 20A is located on the lift and transfer table 28 for transfer by the second conveyor 30 to the lift and lower table 32 or to the workstation 42 by the fourth conveyor 40. A second vehicle body 20B is located on the lift and hold table 26 ready for transfer by the first conveyor 22 to the lift and transfer table 28 and a third vehicle body 20C is being transferred from the lift and hold table 38 to the third conveyor 34 as shown by arrow 48.

Figure 5A:
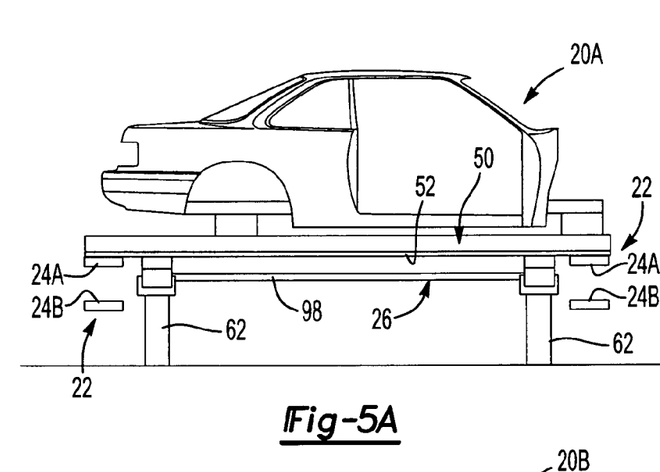
FIGS. 5A and 5B are side views of FIG. 4 in the direction of view arrows 5A-5A and 5B-5B, respectively, illustrating lifting of the vehicle body from the conveyor to a second height.
Figure 5B:
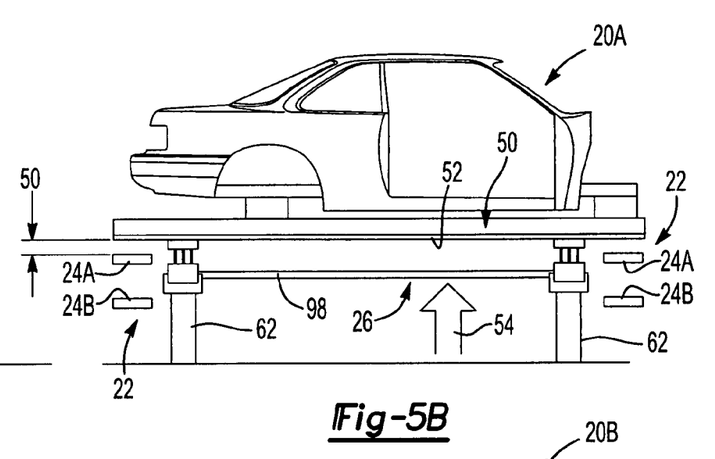

FIGS. 5A and 5B illustrate the upward movement of the lift and transfer table 28 and one embodiment of a pallet 50 suitable for conveying vehicle bodies. In one preferred embodiment of the conveyor system of this invention, elements, such as vehicle bodies, are conveyed on a pallet 50 having a low carbon, base 52 formed of relatively soft steel, such as SAE 1018 or 1020 low carbon steel, and the belt-type conveyors 22 and 34 are preferably formed of plastic, as described further below. As will be understood by those skilled in this art, a continuous belt-type conveyor includes an upper run 24A and a lower run 24B, as further described below with reference to FIG. 7. Prior to receipt of the pallet 50 on the lift and transfer table 28, the soft steel base 52 is received on the upper run 24A of the first conveyor 22 as shown in FIG. 5A. This level is referred to as the "first height" in the description of the operation of the lift tables hereinbelow and the method of this invention. The lift and transfer table 28 then lifts the pallet 50 and the vehicle body 20A to a second height as shown by arrow 54 above the upper run 24A of the first conveyor as shown in FIG. 5B. As will be understood by those skilled in this art, the distance or height the element is lifted will depend upon the application; however, this distance is illustrated by arrows 56 in FIG. 5B. As described above, the vehicle body 20A may then be transferred by the second and fourth conveyors 30 or 40, respectively, either to the lower and transfer table 32 or the workstation 42. The lower and transfer table 32 operates in reverse to the lift and transfer table 28; that is, the lower and transfer table 32 lowers the pallet 50 onto the upper run of the continuous moving belts 36 as will further be understood from a more detailed description of the lift and hold table 26 and the lower and transfer table 32 hereinbelow.

Figure 6A:
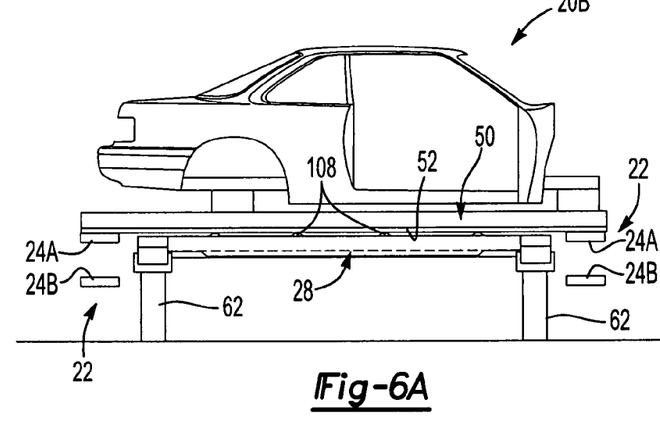
FIGS. 6A and 6B are side views of FIG. 4 in the direction of view arrows 6A-6A and 6B-6B, respectively, illustrating transfer of the vehicle bodies.
Figure 6B:
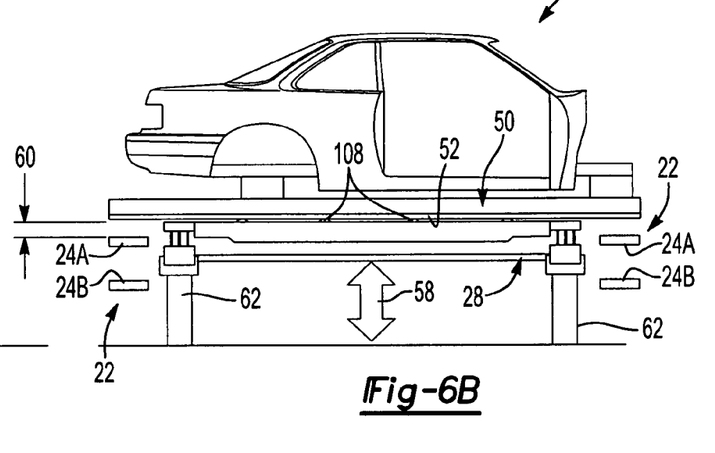

FIGS. 6A and 6B illustrate the upward movement of the lift and hold table 26. In FIG. 6A, the metal base 52 of the pallet 50 is received upon and driven by the upper run 24A of the first conveyor 22 and, upon receipt of the pallet 50 on the lift and hold table 26, the pallet 50 is raised above the upper run 24A of the first conveyor 22 as shown by arrow 58, wherein the second height is spaced above the upper run 24A of the conveyor 22 a distance 60 as shown in FIG. 6B. As will be understood, the distance 60 may be the same as the distance 56 in FIG. 5B. As described further hereinbelow, the lift and hold tables 26 also lower and return the pallet 50 and the conveyed vehicle body 20B to the conveyor 22 as shown by double arrow 58 as required by the production or assembly facility. The lift and hold table 38 may be identical to the operation of the lift and hold table 26. The lift and hold tables 26 and 38, the lift and transfer table 28 and the lower and transfer table 32 may be supported on the facility floor by suitable stanchions or support members 62.

Figure 7:
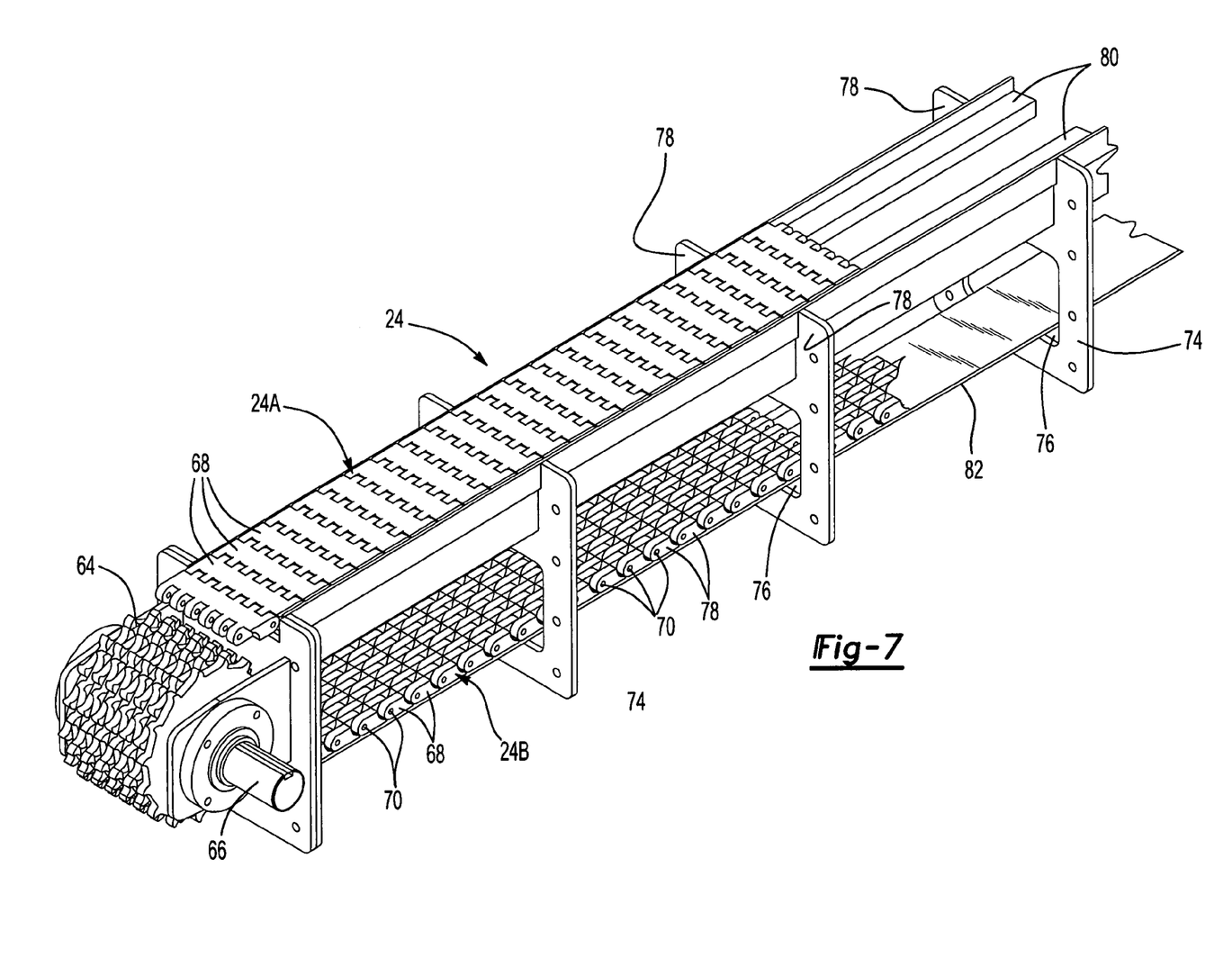
FIG. 7 is a partial side perspective view of one preferred embodiment of a plastic belt-type conveyor of one preferred embodiment of the conveyor system of this invention.

FIG. 7 illustrates one preferred embodiment of the continuous moving belts 24 of the first conveyor 22. As will be understood, however, the spaced continuous moving belts 36 of the disclosed third conveyor 34 may be identical and the conveyors 30 and 40 may also be the same. As typical with belt-type conveyors, the belt includes an upper run 24A which supports and drives the element conveyed and a lower or return run 24B. The belt 24 is received around a drive sprocket 64 having a drive shaft 66 connected to a motor (not shown). As will be understood by those skilled in this art, the opposite end of the conveyor (not shown) is received around a driven sprocket which may be identical to the drive sprocket 64 except that the driven sprocket does not include a motor. In a preferred embodiment, the links 68 are formed of injected molded plastic, such as polyester or polypropylene, which are pivotally interconnected by pins 70 received through aligned bores or openings 72 in the links forming a continuous belt or chain. A suitable belt-type conveyor of the type disclosed is available from Uni-Chains Manufacturing Inc. of Reading, Pa. As set forth above, the use of two spaced continuous moving belts formed of pivotally interconnected plastic links significantly reduces noise level within the facility and significantly reduces wear or damage to the conveyor and the conveyed elements, particularly the pallets 50 when used in combination with a relatively soft low carbon steel base 52. In one preferred embodiment, the conveyor assembly includes spaced vertical frame members 74 each having a rectangular opening 76 which receives the return run 24B of the plastic belt 24 and spaced upwardly extending flange portions 78 which support spaced rails 80. The rails 80 support the upper run 24A of the conveyor belts 24. In a preferred embodiment, the lower run 24B is supported by a plate 82, which is preferably formed of plastic, such as a polyester or polypropylene, supporting the return run, preventing sag of the return run and further reducing wear of the plastic belts.

Figure 8:
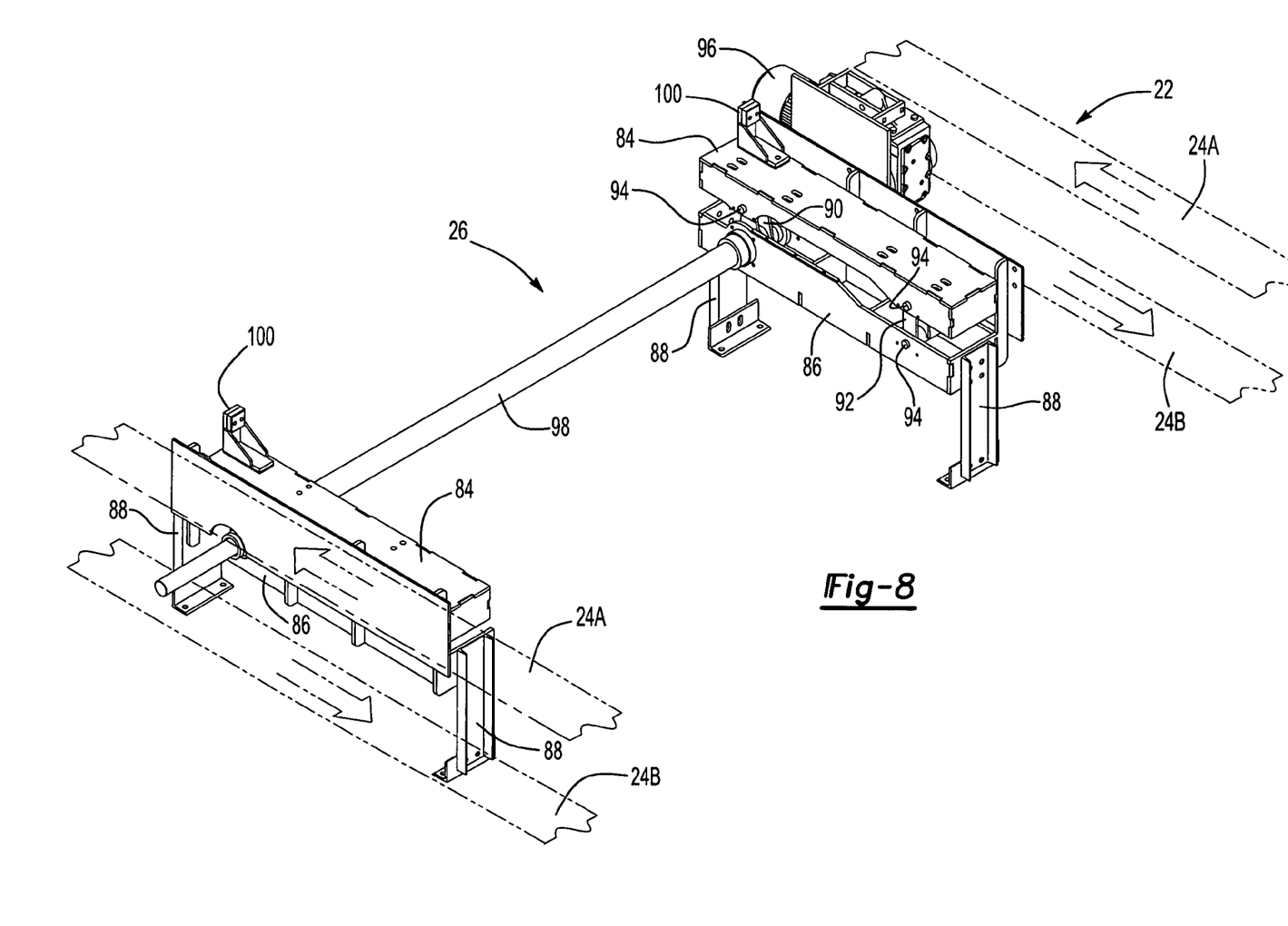
FIG. 8 is a top perspective view of one embodiment of a lift and hold table of the conveyor system of this invention.

FIG. 8 illustrates one embodiment of a lift and hold table 26 in the first conveyor 22. The lift and hold table 38 in the third conveyor 34 may be identical. Further, as set forth above, the first and third conveyors 22 and 34, respectively, may include a plurality of spaced lift and hold tables, preferably located between the spaced continuous moving belts 24, which lift and hold the pallets 50 and the vehicle bodies 20 for later conveyance on the conveyors 22 and 34 as required by the operation of the manufacturing, assembly or paint facility. The disclosed embodiment of the lift and hold tables 26 include spaced parallel upper support frame members 84 and lower support frame members 86. The lower support frame members 86 may be supported by brackets 88 supported by stanchions (not shown) fixed to the floor of the facility. The upper support frame members 84 are pivotally supported on the lower frame members 86 by a parallelogram linkage, including drive links 90 and driven links 92. As described below with regard to the lift and transfer table 28, which also includes the same parallelogram support, the drive and driven links, 90 and 92, respectively, each include parallel support plates and rollers or pivot pins (described below) which are pivotally connected to the frame members by pivot pins 94. The drive links 90 are driven by a motor 96 and interconnected by drive shaft 98. As described in more detail below with respect to FIGS. 11 to 14, the lift and hold tables 26 and 38 lift the pallets 50 from the conveyors 22 and 34, respectively, while simultaneously moving the pallets in the direction of travel of the conveyors. The forward motion of the pallets 50 may then be decelerated as the pallets 50 reach the upper position, referred to as the second height. When the pallets are needed by the next operation, the lift tables accelerate the motion of the pallets to generally the velocity of the conveyors and simultaneously lower the pallets 50 onto the conveyors, thereby reducing wear or damage to the conveyors and the elements conveyed. In a preferred embodiment, the upper support frame members 84 include stops 100 which align the pallets on the upper support frame members 84, but the pallets do not impact the stops 100 because of the motion of the upper support frame members 84 described above. Further, because the upper support frame members 84 are pivotally supported on the lower support frame members 86 by a parallelogram linkage, the pallets 50 are raised and lowered in parallel relation to the conveyors and are not tipped or tilted.

Figure 9:
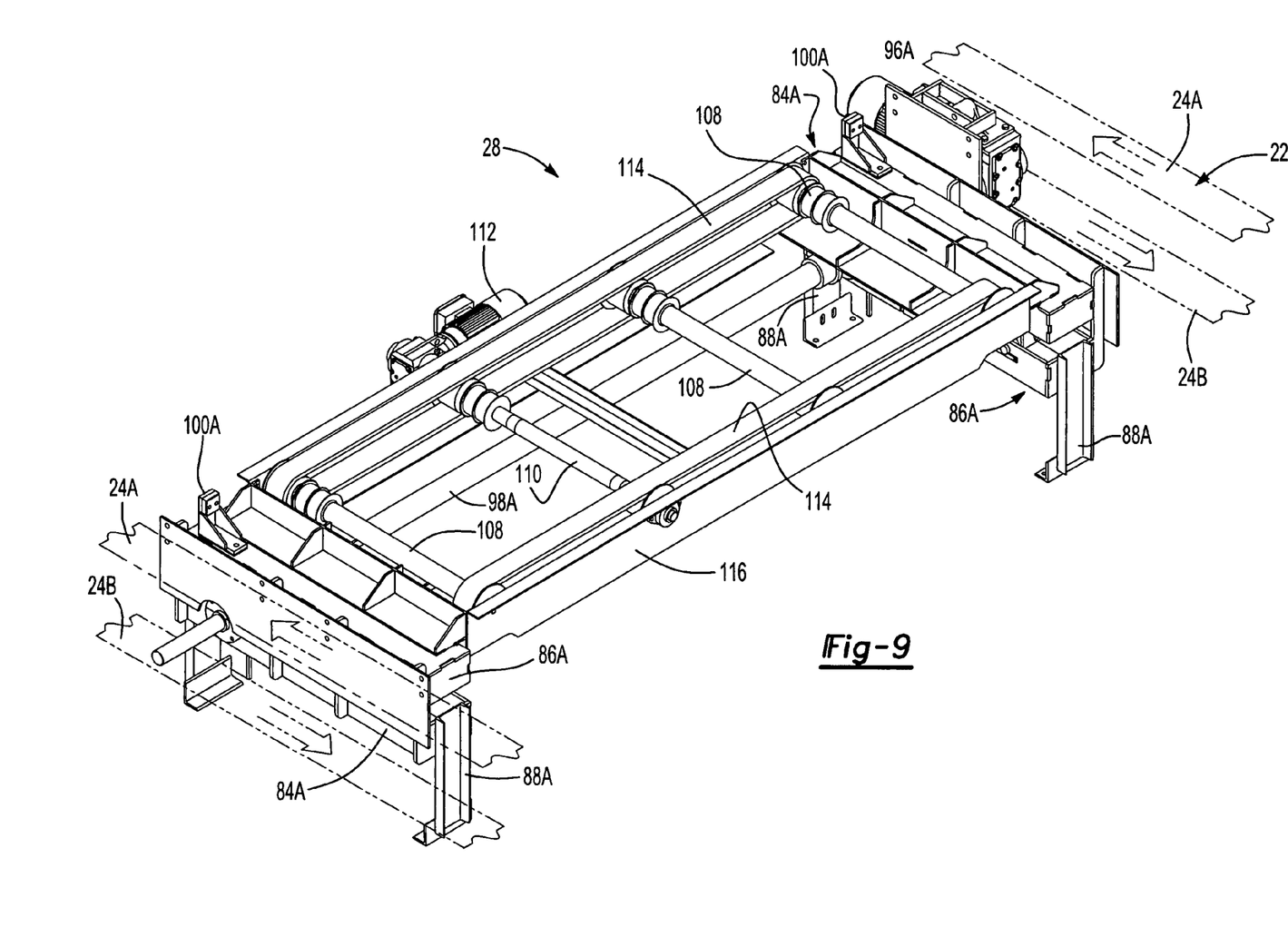
FIG. 9 is a top perspective view of one embodiment of a lift and transfer table or lower and transfer table of this invention.
Figure 10:
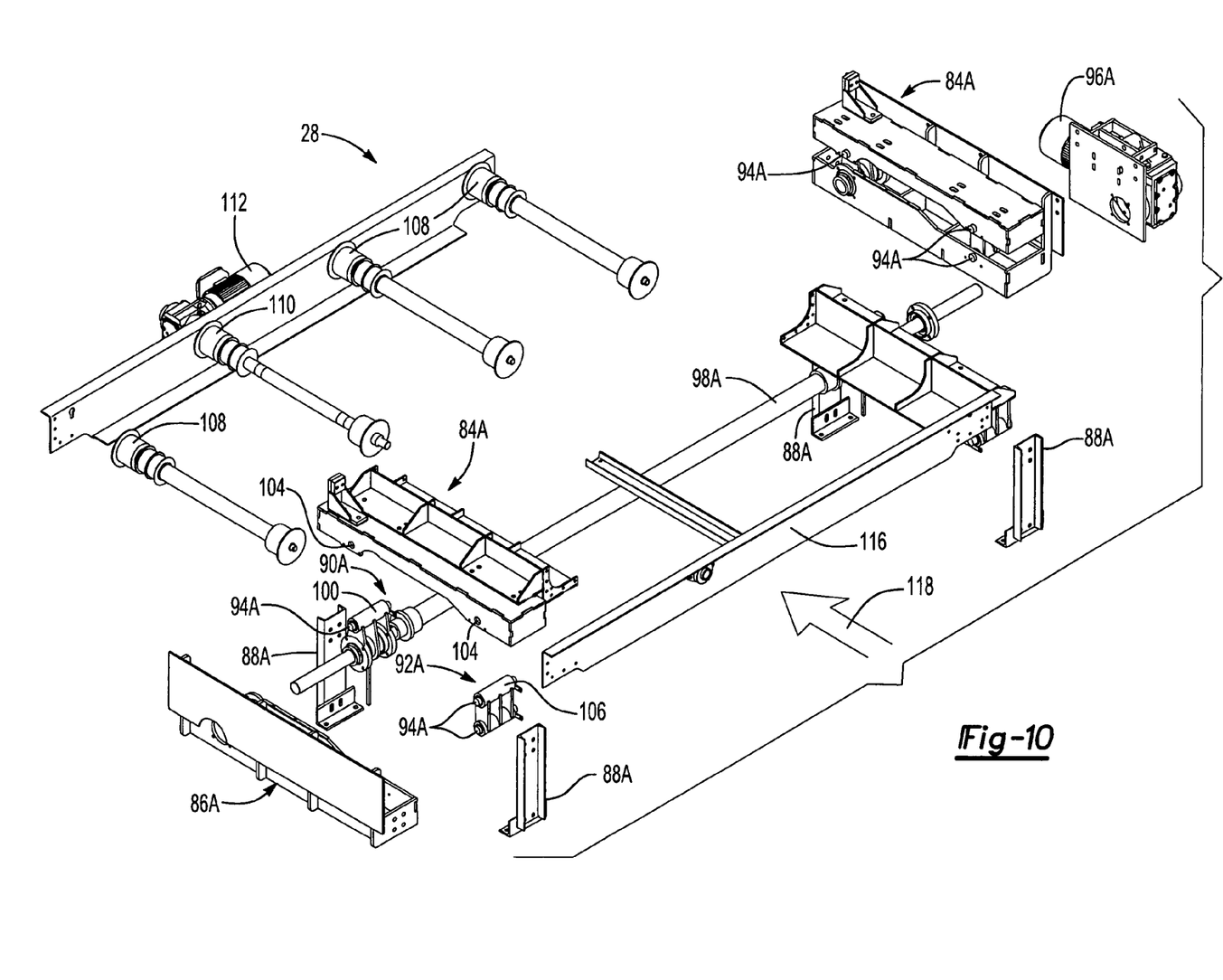
FIG. 10 is an exploded view of the transfer table shown in FIG. 9.

FIGS. 9 and 10 illustrate one embodiment of a lift and transfer table 28 of this invention. As described below, the lower and transfer table 32 may be identical, except for the operation of the table. As described above with regard to the lift and hold tables 26 and 38, the lift and transfer table 38 includes spaced parallel upper support frame members 84A and lower support frame members 86A. The upper support frame members 84 are pivotally supported on the lower support frame members 86 by a parallelogram linkage including drive links 90A and driven links 92A. As shown in FIG. 10, the drive links 90A include a cylindrical portion 102 having rotatable pivot pins 94A which are received in openings 104 in the upper support frame members 84A and the driven links 92A include upper and lower cylindrical portions 106 which receive pivot pins 94A which are pivotally supported in openings 104 of the upper and lower frame members 84 and 86, respectively. The drive links 90A are fixed to drive shaft 98A as described above, and the drive shaft 98A is driven by motor 96A. The lift and transfer table 28 in this embodiment includes driven rollers 108 and drive roller 110 connected to motor 112. As shown in FIG. 9, belts 114 are received around the drive and driven rollers 110 and 108, respectively, such that the belts 114 may be driven in either direction to convey a pallet 50 as described above. In the disclosed embodiment, the drive and driven rollers 110 and 108, respectively, are rotatably supported on a frame assembly 116 and the motor 112 is also supported on the same frame assembly. The lower support frame member 86A is supported by brackets 88A as described above. As will be understood from the above description of the lift and transfer table 28, the common elements of the lift and transfer table 28 and the lift and hold table 26 are numbered the same, except that the common elements of the lift and transfer table 28 includes the suffix "A."

As described above and further described below, pallets or other elements are received on the lift and transfer table 28 as shown by the arrow 118 in FIG. 10. The lift and transfer table 26 lifts a pallet 50 from the conveyor 22 while simultaneously moving the pallet in the direction of travel of the conveyor 22, then decelerates motion of the pallet 50 as the pallet reaches the upper position or second height shown in FIG. 9. The parallelogram support linkage maintains the pallet 50 parallel to the first conveyor 22 which generally will be parallel to the floor supporting the first conveyor 22. Stops 100A may be provided on the upper support frame member 84A to assure that the pallet is aligned on the lift and transfer table 28. However, the operation of the lift and transfer table described herein assures that the pallet does not impact the stops 100A with sufficient force to damage the pallet. The pallet may then be transferred by the belts 114 either to the fourth conveyor 40 leading to the workstation 42 or the second conveyor 30 to a further or third conveyor 34, as described above with reference to FIGS. 1 and 4. The construction of the lower and transfer table 32 may be identical to the lift and transfer table 28 shown in FIGS. 9 and 10 except that the operation is reversed as described above. That is, the lower and transfer table 32 lowers a pallet 50 onto the third conveyor 34 and simultaneously accelerates the motion of the pallet 50 to generally the velocity of the third conveyor 34.

Figure 11:
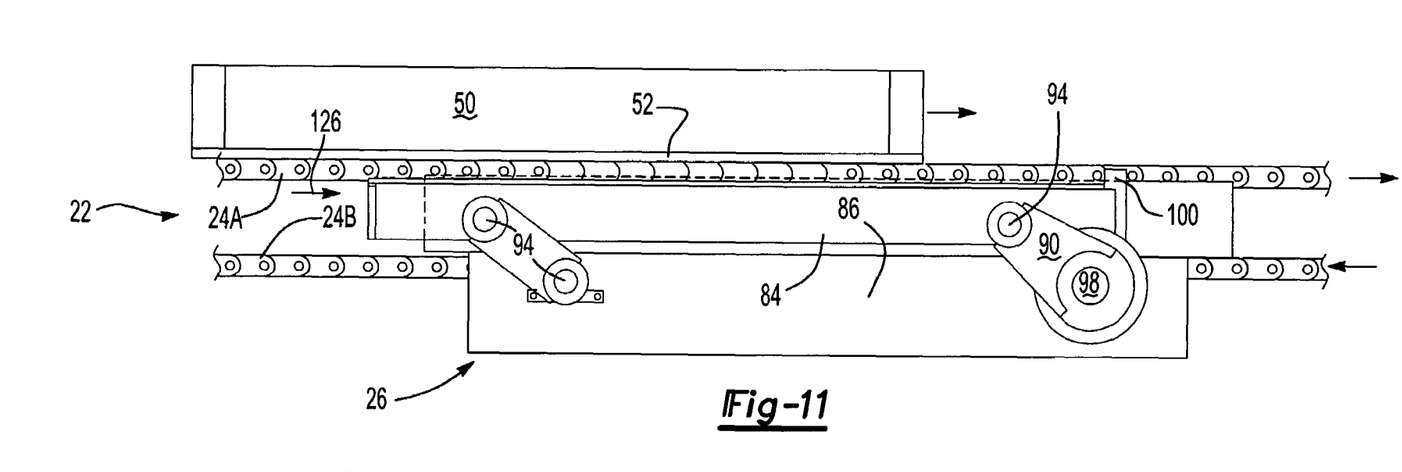
FIGS. 11 to 14 illustrate the sequence of operation of a lift and hold table.
Figure 12:
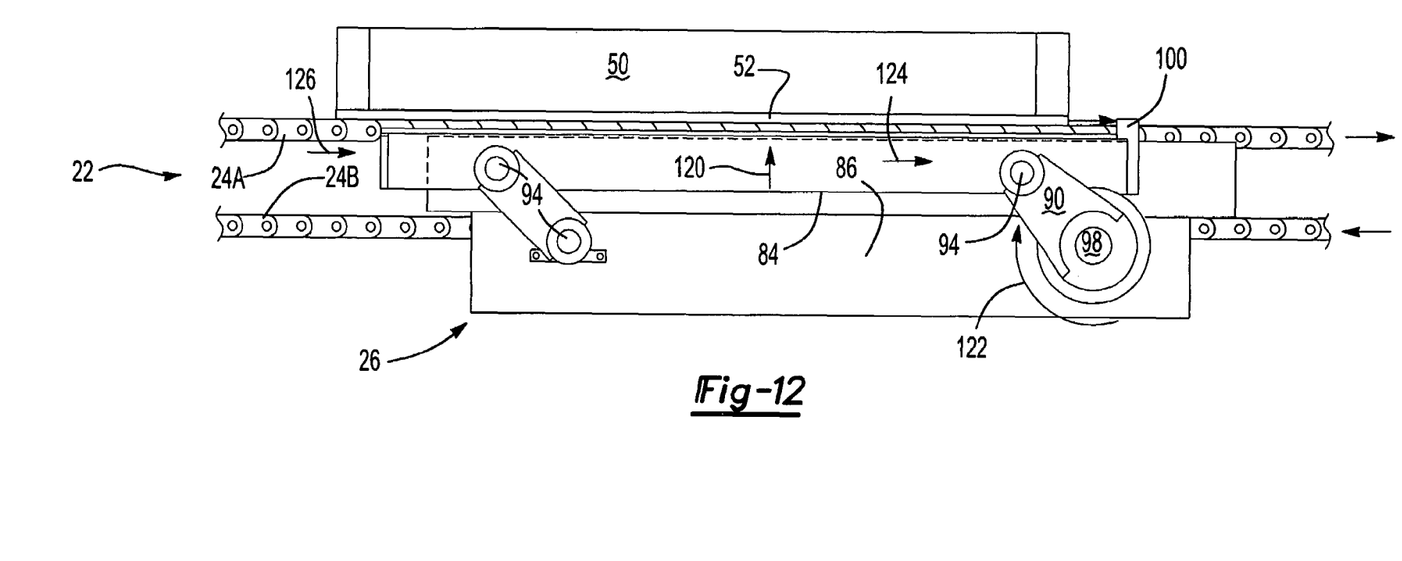
Figure 13:
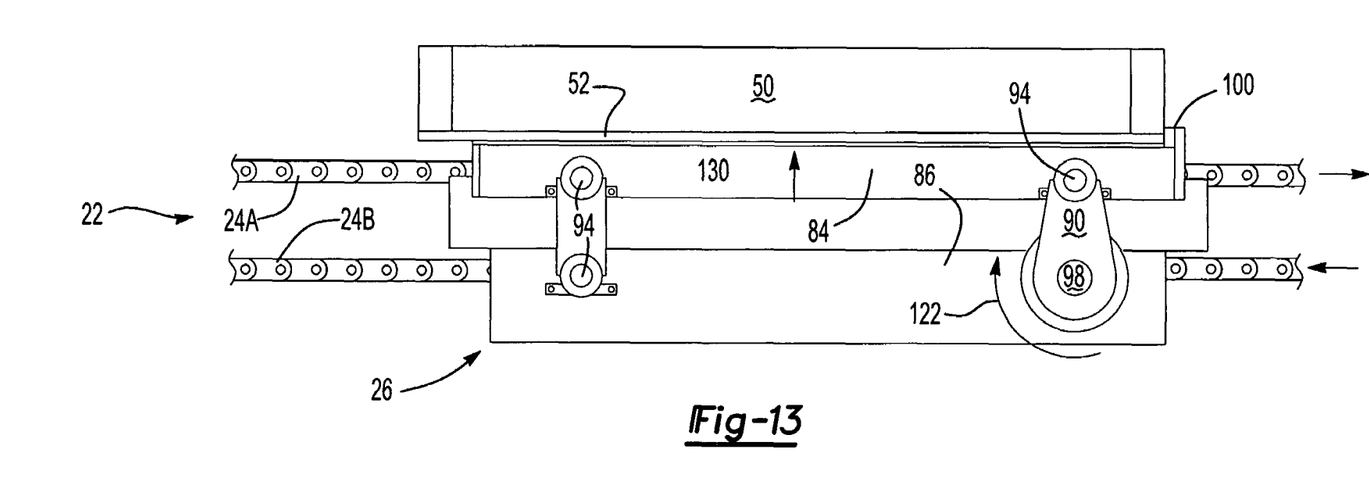

FIGS. 11 to 14 and 15 illustrate the operation of the lift tables, including the lift and hold tables 26 and 38, the lift and transfer table 28 and the lower and transfer table 32 as now described. For ease of description, the components of the lift tables are numbered the same as the numbering of the lift and hold table 26. In FIG. 11, a pallet 50 supported and conveyed by the upper pass 24A of the conveyor 22 is received on the upper support frame members 84 of the lift and hold table 26. In FIG. 11, the upper support frame members 84 are in the lower position and the stop 100 is below the level of the upper pass 24A of the first conveyor 22 so that a pallet 50 may be conveyed over the lift and hold table 26 or lifted by the lift and hold table 26 depending upon the requirements of the conveyor system. Where a pallet 50 is to be removed from the first conveyor 22, the upper support frame members 84 then lift as shown by arrow 120 in FIG. 12. The motor 96 shown in FIG. 8 rotates the drive shaft 98, rotating the drive links 90 as shown by arrow 122, raising the stop 100. In a preferred embodiment, the pallet 50 is simultaneously accelerated in the direction of arrow 124 to about the velocity of the conveyor 22 as shown by arrow 126 and the pallet 50 is simultaneously raised to a second height as shown by arrow 130 in FIG. 13. The base 52 of the pallet 50 is then located above the upper pass 24A of the conveyor 22 in a rest or hold position, wherein the end of the pallet 50 engages the stop 100. The deceleration of the pallet 50 to a rest position at the second height may be accomplished by motor 96 or the pallet may be allowed to slide to the rest position. In a preferred embodiment, the forward motion of the pallet 50 is decelerated as it approaches the second height, limiting impact of the pallet 50 against the stop 100. In the case of the lift and transfer table 28, this is the full range of motion of the table. Further, the lower and transfer table 32 starts with the pallet 50 in the second position above the level of the third conveyor 34 as shown in FIG. 13.

Figure 14:
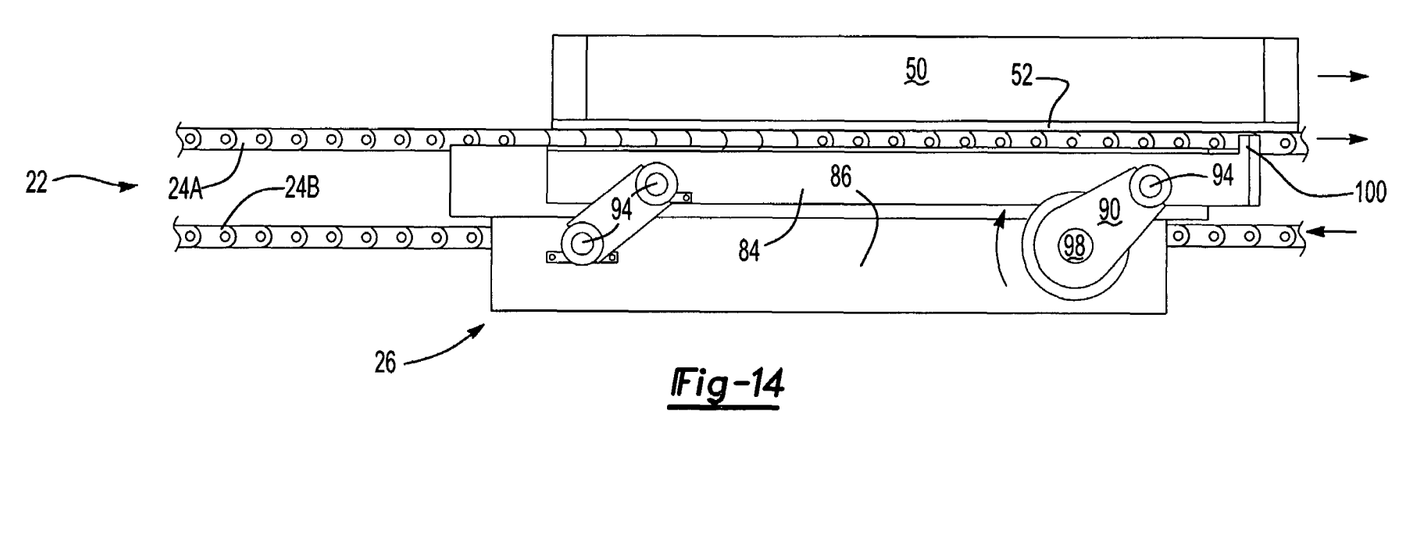
Figure 15:
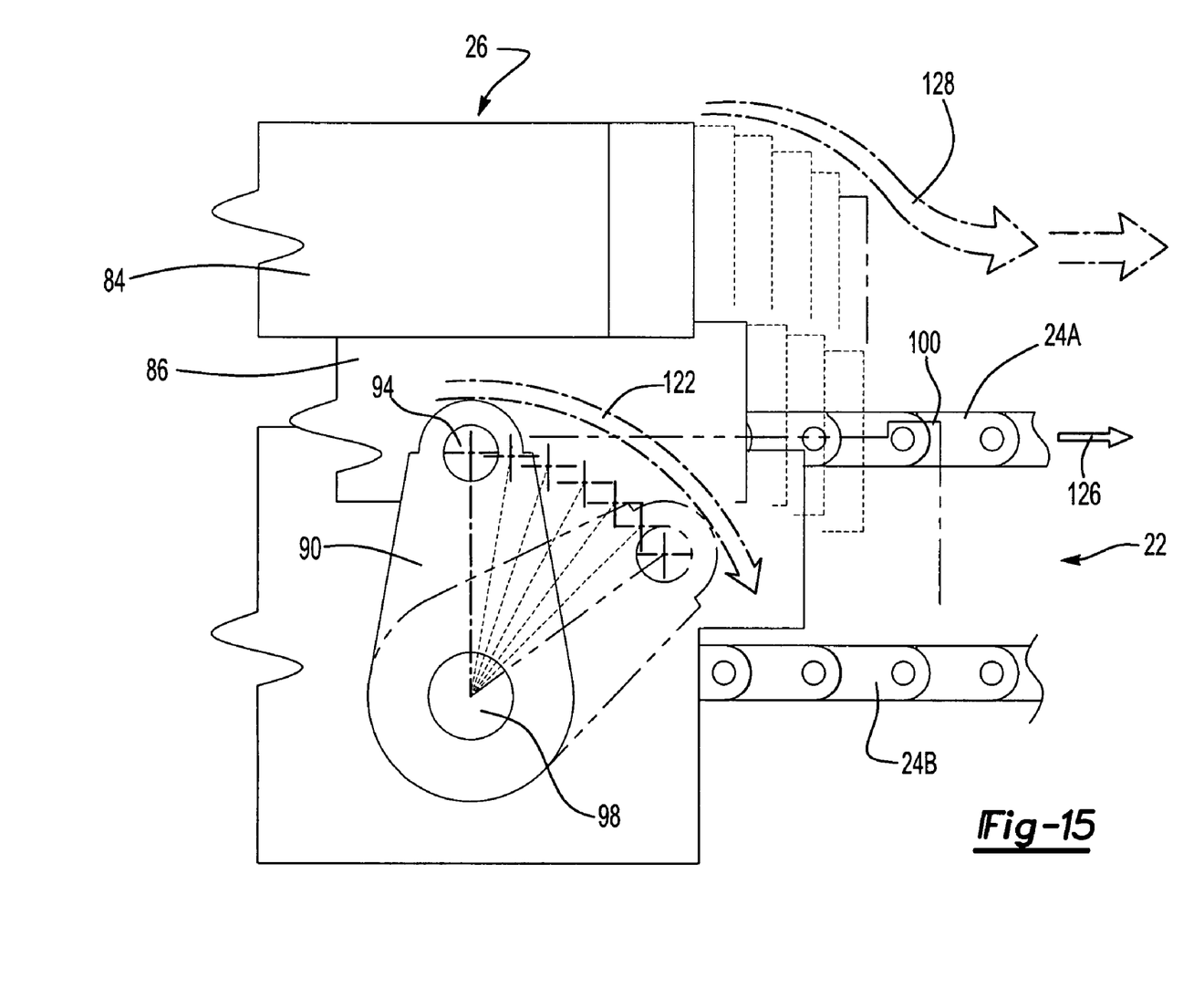
FIG. 15 is a partially schematic illustration of an operation of the lift and hold table or the lift and transfer table of one embodiment of the conveyor system of this invention.

The lift and hold tables 26 and 38 and the lower and transfer table 32 are also adapted to lower the pallet onto a continuously moving conveyor as now described with regard to FIGS. 14 and 15. Again, for ease of reference, FIGS. 14 and 15 are numbered the same as the lift and hold table 26. When the pallet 26 is to be lowered onto the first conveyor 22, the drive links 90 of the parallelogram support linkage are rotated in the direction of movement of the upper pass 24A of the first conveyor 22 as shown by arrow 122, accelerating motion of the pallet 26 as shown by arrow 128 in the direction of motion of the conveyor 22 as shown by arrow 126. The pallet is simultaneously lowered onto the upper pass 24A of the conveyor 22, reducing damage or wear of the pallet 26 and the first conveyor 22. As described above, the lower and transfer table 32 starts with the pallet at the second height above the continuous moving belts 36 of the conveyor 34 as shown in FIG. 13. The lower and transfer table 32 then lowers the pallet 50 onto the continuous moving belts 36 of the third conveyor 34 as shown in FIGS. 14 and 15. The operation of the lift and hold table 38 is identical to the lift and hold table 26 described above.

Having described a preferred embodiment of the conveyor system 10 of this invention and the operation of the components, the method of conveying elements of this invention will be understood by those skilled in this art. The method of conveying elements on a conveyor of this invention thus includes conveying an element on a first moving conveyor in a first direction at a first height, then lifting an element from the first moving conveyor upwardly to a second height and simultaneously moving the element in the first direction, thereby reducing shock to the element as the element is moved from the first moving conveyor to the second height. A preferred embodiment of the method of this invention further includes initially moving the element in the first direction at generally the velocity of the first moving conveyor as the element is lifted from the first moving conveyor, then decelerating movement of the element as the element is moved upwardly to the second height. Where the element is returned to the first conveyor or to another conveyor, a preferred embodiment of the method of this invention then includes accelerating movement of the element from a rest position at the second height in the first direction preferably generally at the velocity of the conveyor as the element is received on the conveyor. In a preferred embodiment, the element is maintained in parallel relation to the conveyor as the conveyor lifts the element from the first conveyor or lowers the element to the same or a third conveyor. As will be understood from this description, the lift tables 26, 28, 32 and 38 do not need to move the elements to the full velocity of the conveyors 22 or 34 to reduce wear or damage. However, in a preferred embodiment, the elements are moved to generally the velocity of the conveyor.

Where the element is supported on a pallet, such as the pallet 50 described above, the pallet preferably includes a low carbon relatively soft steel base and the conveyor preferably comprises two spaced parallel continuous moving belts formed of plastic, wherein the belts may be comprised of pivotally interconnected plastic links, significantly reducing noise and damage to the conveyor and the pallet. The method of this invention may also include lifting an element from the first conveyor to a second height above the first conveyor and conveying the element on a second conveyor generally transverse to the first conveyor. The method of this invention may further include lowering the element from the second conveyor to a third conveyor and simultaneously accelerating the element to generally the velocity of the third conveyor as described above. In a further preferred embodiment of the method of this invention, the first or third conveyor may include a plurality of spaced lift and hold tables for holding elements above the first or third conveyors for later use, wherein the lift and hold tables lift the element from the conveyor and simultaneously move the element in the direction of travel of the conveyor, limiting damage to the conveyor and the element. The method of this invention may further include lowering the element to the conveyor and simultaneously accelerating the element to generally the velocity of the conveyor to reduce damage to the conveyor and the element.

As will be understood by those skilled in this art, various modifications may be made to the conveyor system and method of this invention within the purview of the appended claims. For example, the second and fourth conveyors 30 and 40, respectively, may be belt-type conveyors as described above with regard to the first and third continuous moving belt conveyors 22 and 34. Further, the lift tables, including the lift and hold tables 26 and 38, the lift and transfer table 28 and the lower and transfer table 32 may be used in combination with a more conventional conveyor, including roller type conveyors and steel link conveyors although the noise level will be significantly increased and the conveyors will require more frequent replacement. Further, when a pallet is utilized to support and convey the elements as described above, the pallets may be damaged by more conventional conveyors. Finally, other lift tables may be utilized and this invention is not limited to the use of a lift table having a parallelogram support linkage. Having described a preferred embodiment of the conveyor system and method of this invention, the invention is now claimed, as follows.

The invention claimed is:

1. A method of conveying elements on a conveyor system, comprising the following steps:

conveying an element on a first moving conveyor in a first direction at a first height at a first velocity generally equal to a velocity of said first moving conveyor;

lifting said element from said first moving conveyor upwardly to a second height, and simultaneously moving said element in said first direction at generally said first velocity and then decelerating movement of said element in said first direction, thereby reducing shock to said element as said element is moved from said first moving conveyor to said second height.

2. The method of conveying elements as defined in claim 1, wherein said method includes lifting said element from said first moving conveyor upwardly and simultaneously moving said element in said first direction of said moving conveyor while maintaining said element parallel to said first moving conveyor.

3. The method of conveying elements as defined in claim 1, wherein said method includes holding said element at said second height, then moving said element in said first direction of said first moving conveyor and simultaneously lowering said element to said first height onto said first moving conveyor.

4. The method of conveying elements as defined in claim 3, wherein said method includes accelerating movement of said element from a rest position at said second height in said first direction to generally a velocity of said first moving conveyor as said element is received onto said first moving conveyor.

5. The method of conveying elements as defined in claim 1, wherein said method further includes conveying said element on a second conveyor at said second height to a third moving conveyor having a third height lower than said second height, then moving said element in a second direction of movement of said third moving conveyor and simultaneously lowering said element onto said third moving conveyor and conveying said element on said third moving conveyor.

6. The method of conveying elements as defined in claim 1, wherein said element is supported on a pallet having a flat lower surface and said first moving conveyor including two spaced parallel continuous moving plastic belts, said method including supporting said pallet on said plastic belts and moving said plastic belts to convey said pallet and said element in said first direction.

7. The method of conveying elements as defined in claim 6, wherein said spaced continuous plastic belts are each supported and driven by sprockets, each having a lower return run, said method including supporting said lower return run of said plastic belts by a plastic support member.

8. The method of conveying elements as defined in claim 1, wherein said first moving conveyor includes a plurality of spaced lift tables, each lift table adapted to lift an element from said first moving conveyor, simultaneously moving an element in said first direction of said first moving conveyor and lifting an element from said first moving conveyor to said second height, said plurality of lift tables adapted to hold a plurality of elements above said first moving conveyor in spaced relation.

9. The method of conveying elements as defined in claim 8, wherein each of said lift tables is adapted to move an element in said first direction of said first moving conveyor and simultaneously lift said element from said first moving conveyor in parallel relation to said first moving conveyor.

10. The method of conveying elements as defined in claim 8, wherein each of said lift tables is further adapted to simultaneously lower an element onto said first conveyor and move an element in said first direction to generally a velocity of said first moving conveyor.

11. A method of conveying elements on a conveyor system, comprising the following steps:
conveying an element on a first moving conveyor in a first direction at a first height; and
lifting said element from said first moving conveyor upwardly to a second height while initially moving said element at generally a velocity of said first moving conveyor, then decelerating movement of said element to a rest position at said second height, thereby reducing shock to said element as said element is moved from said first moving conveyor to said second height.

12. The method of conveying elements as defined in claim 11, wherein said method includes lifting said element from said first conveyor to said second height while maintaining said element parallel to said first moving conveyor.

13. The method of conveying elements as defined in claim 11, wherein said method includes holding said element at said second height, then moving and accelerating said element in said first direction to generally a velocity of said first moving conveyor and simultaneously lowering said element to said first height onto said first moving conveyor.

14. The method of conveying elements as defined in claim 11, wherein said method further includes conveying said element on a second conveyor at said second height to a third moving conveyor having a third height lower than said second height, then moving said element in a direction of movement of said third moving conveyor and simultaneously lowering said element onto said third moving conveyor and conveying said element on said third moving conveyor.

15. The method of conveying elements as defined in claim 14, wherein said method further includes accelerating movement of said element in a direction of movement of said third moving conveyor to generally a velocity of said third moving conveyor as said element is lowered onto said third moving conveyor.

16. A conveyor system for conveying elements, comprising:
a continuously moving first conveyor at a first height conveying elements in a first direction; and
a first lift mechanism in line with said first conveyor receiving an element from said first conveyor, lifting said element from said first conveyor to a second height, and simultaneously moving said element in said first direction and decelerating movement of said element in said first direction to reduce shock to said first element as said element is lifted from said first conveyor to said second height, said lift mechanism then lowering said element onto said first conveyor and simultaneously accelerating said element in said first direction to generally a velocity of said first conveyor.

17. The conveyor system as defined in claim 16, wherein said lift mechanism initially moves said element in said first direction at a velocity generally equal to a velocity of said first conveyor, then decelerates motion of said element as said element reaches said second height.

18. The conveyor system as defined in claim 17, wherein said lift mechanism decelerates motion of said element in said first direction to rest at said second height.

19. The conveyor system as defined in claim 16, wherein said lift mechanism has a parallelogram support, lifting said element and simultaneously moving said element in said first direction while maintaining said element parallel to said first conveyor.

20. The conveyor system as defined in claim 16, wherein said conveyor system includes a second conveyor intersecting said first lift mechanism at said second height conveying said element to a second lift mechanism receiving said element, and said conveyor system further including a continuously moving second conveyor intersecting said second lift mechanism having a third height spaced below said second height, said second lift mechanism lowering said element onto said third conveyor and simultaneously accelerating said element to generally a velocity of said third conveyor.

21. The conveyor system as defined in claim 16, wherein said first conveyor includes two spaced continuous moving plastic belts and said element supported by and moveable with said plastic belts.

22. The conveyor system as defined in claim 21, wherein said element is mounted on a pallet having a metal base, said metal base of said pallet supported on and moved by said continuous moving plastic belts.

23. The conveyor system as defined in claim 22, wherein said plastic belts are comprised of pivotally interconnected plastic links, said plastic belts driven by sprockets, each having a return loop and said return loop slideably supported by a plastic support member.

24. The conveyor system as defined in claim 22, wherein said metal base of said pallet is a soft, low carbon steel.

25. A conveyor system conveying elements mounted on pallets, comprising:
   a continuously moving first conveyor including two parallel spaced plastic belts comprised of pivotally interconnected plastic links mounted on and driven by sprockets, each bell having a return loop; and
   a plurality of pallets each having an element mounted thereon including a flat metal base formed of low carbon steel supported on and conveyed by said spaced continuous plastic belts and said base defining a datum of said pallets.

26. The conveyor system as defined in claim 25, wherein said first conveyor includes a plurality of spaced lift tables located between said spaced continuous plastic belts, said lift tables each adapted to lift a pallet from said plastic belts and simultaneously move said pallet in a direction of travel of said first conveyor, thereby reducing shock to said pallets as said pallets are lifted from said first conveyor.

27. The conveyor system as defined in claim 26, wherein said lift tables initially move a pallet in said direction of travel of said first conveyor at generally a velocity of said first conveyor, then decelerate motion of said pallet as said pallet reaches a hold position above said first conveyor.

28. The conveyor system as defined in claim 27, wherein said lift tables are supported on a parallelogram linkage, lifting a pallet and simultaneously moving said pallet in said direction of travel of said first conveyor while maintaining said pallet parallel to said plastic belts.

29. The conveyor system as defined in claim 25, wherein said conveyor system includes a lift table at an end of a run of said first conveyor extending generally transverse to said first conveyor, said lift table receiving a pallet from said first conveyor, lifting said pallet to a second height and simultaneously moving said pallet in a direction of movement of said first conveyor.

30. The conveyor system as defined in claim 29, wherein said lift table initially moves said pallet in a direction of movement of said first conveyor, then decelerates movement of said pallet to a rest position at said second height.

31. The conveyor system as defined in claim 29, wherein said conveyor system includes a second conveyor aligned with said lift table conveying said pallet generally transverse to a movement of said first conveyor.

* * * * *